United States Patent
Oku (10) Patent No.: US 9,079,106 B2
(45) Date of Patent: Jul. 14, 2015

(54) SERVER AND METHOD FOR PROVIDING A VIDEO GAME

(71) Applicant: DeNA Co., Ltd., Tokyo (JP)

(72) Inventor: Kazuho Oku, Tokyo (JP)

(73) Assignee: DeNA CO., LTD., Tokyo (JP)

( * ) Notice: Subject to any disclaimer, the term of this patent is extended or adjusted under 35 U.S.C. 154(b) by 0 days.

(21) Appl. No.: 14/011,605

(22) Filed: Aug. 27, 2013

(65) Prior Publication Data

US 2015/0045121 A1 Feb. 12, 2015

(30) Foreign Application Priority Data

Aug. 12, 2013 (JP) ................................. 2013-167266

(51) Int. Cl.
*A63F 13/12* (2006.01)
*A63F 13/10* (2006.01)
*H04N 19/543* (2014.01)
(Continued)

(52) U.S. Cl.
CPC ................. *A63F 13/12* (2013.01); *A63F 13/10* (2013.01); *A63F 2300/209* (2013.01); *A63F 2300/538* (2013.01); *A63F 2300/66* (2013.01); *A63F 2300/6623* (2013.01); *H04N 19/543* (2014.11); *H04N 19/563* (2014.11)

(58) Field of Classification Search
CPC ................. A63F 13/12; A63F 2300/66; A63F 2300/6623; A63F 2300/209; A63F 2300/538; H04N 19/543; H04N 19/563
USPC .................. 463/42, 30–34; 345/619
See application file for complete search history.

(56) References Cited

U.S. PATENT DOCUMENTS

| 6,256,040 B1 * | 7/2001 | Tanaka et al. ................. 345/421 |
| 6,362,817 B1 * | 3/2002 | Powers et al. ................. 345/419 |

(Continued)

FOREIGN PATENT DOCUMENTS

| JP | 2002-336553 | 11/2002 |
| JP | 2001-056823 | 2/2013 |

(Continued)

OTHER PUBLICATIONS

"iPhone and iPad Game Programming with cocos2d," Impress Japan Corporation, Jul. 1, 2011, First Edition, First Issue, pp. 249-252.

(Continued)

*Primary Examiner* — William H McCulloch, Jr.
(74) *Attorney, Agent, or Firm* — Pillsbury Winthrop Shaw Pittman LLP (57) ABSTRACT

One object of the present invention is to reduce the load on a server and reduce the communication traffic produced in providing online games. In accordance with one aspect, the server can execute a game program including: a game progress module for progressing a game; a generation module for generating, at first time intervals, frame information containing a plurality of drawing commands to be executed on a terminal device to render one frame of a game screen; a determination module for determining whether to send the generated frame information to the terminal device; a compression module for compressing the generated frame information; a sending module for sending to the terminal device the compressed frame information to be sent; and a request module for requesting drawing execution time information from the terminal device at second time intervals.

4 Claims, 6 Drawing Sheets

(51) Int. Cl.
*A63F 13/30* (2014.01)
*A63F 13/40* (2014.01)
*H04N 19/563* (2014.01)

(56) References Cited

U.S. PATENT DOCUMENTS

| | | | |
|---|---|---|---|
| 6,831,659 B1* | 12/2004 | Mukoyama et al. | 345/619 |
| 7,064,767 B2* | 6/2006 | Matsumoto et al. | 345/582 |
| 7,542,047 B2* | 6/2009 | Yamauchi | 345/582 |
| 7,701,455 B2* | 4/2010 | Tsao | 345/419 |
| 7,881,521 B2* | 2/2011 | Kaku et al. | 382/154 |
| 8,147,339 B1* | 4/2012 | Perry | 463/42 |
| 8,207,966 B2* | 6/2012 | Sommers | 345/423 |
| 8,368,686 B2* | 2/2013 | Sommers | 345/419 |
| 8,715,091 B1* | 5/2014 | Hashimoto et al. | 463/42 |
| 8,864,583 B1* | 10/2014 | Lotzer | 463/31 |
| 8,953,675 B2* | 2/2015 | Laan et al. | 375/240.1 |
| 8,964,830 B2* | 2/2015 | Perlman et al. | 375/240.01 |
| 2001/0001019 A1* | 5/2001 | Kadono | 382/277 |
| 2001/0016006 A1* | 8/2001 | Kadono | 375/240.16 |
| 2005/0035979 A1* | 2/2005 | Mukoyama et al. | 345/619 |
| 2007/0115288 A1* | 5/2007 | Cronin et al. | 345/473 |
| 2009/0080523 A1 | 3/2009 | McDowell | |
| 2009/0083396 A1* | 3/2009 | Roos | 709/219 |
| 2009/0083670 A1* | 3/2009 | Roos | 715/850 |
| 2011/0092284 A1* | 4/2011 | Kando et al. | 463/31 |
| 2011/0098114 A1* | 4/2011 | Ishida | 463/36 |
| 2011/0122063 A1* | 5/2011 | Perlman et al. | 345/161 |
| 2011/0157196 A1 | 6/2011 | Nave et al. | |
| 2013/0028514 A1* | 1/2013 | Kihira | 382/167 |
| 2015/0045119 A1* | 2/2015 | Oku | 463/31 |
| 2015/0045121 A1* | 2/2015 | Oku | 463/42 |

FOREIGN PATENT DOCUMENTS

| | | |
|---|---|---|
| JP | 2013/066524 | 4/2013 |
| JP | 2013-085891 | 5/2013 |

OTHER PUBLICATIONS

Japanese Office Action in connection with Japanese Patent Application No. 2013-167266 issued on Oct. 1, 2013.
"Android Application Super Bible," Socym Co., Ltd, Apr. 7, 2011, First Edition, Second Issue, upper portion of p. 119.
The extended European Search Report mailed on Nov. 10, 2014 in connection with corresponding European Patent Application No. 14180092.0.
The extended European Search Report mailed on Nov. 10, 2014 in connection with European Patent Application No. 14180092.0.

* cited by examiner

Statistical Information Management Table

| Terminal ID |
| Sending Time |
| Drawing Execution Time Information |
| Receiving Time |
| Maximum Frame Rate |
| ... |

```
drawImage("I1",-3,-4)
drawImage("I2",13,-4)
drawImage("I3",29,-4)
. . .
drawImage("I4",-3,12)
drawImage("I5",13,12)
drawImage("I6",29,12)
. . .
fillText(" Score:000000",70,5)
. . .
drawImage("I13",14, 45)
. . .
drawImage("I10", 68, 38)
drawImage("I11", 66, 40)
drawImage("I12", 67, 44)
. . .
rotate(45)
drawImage("I7", 65, 73)
rotate(45)
drawImage("I8", 62, 78)
rotate(45)
drawImage("I9", 59, 81)
. . .
```

Fig. 6

```
drawImage("I1",-3,-4)
drawImage("I2",16,0)
drawImage("I3",16,0)
 . . .
drawImage("I4",95,16)
drawImage("I5",16,0)
drawImage("I6",16,0)
 . . .
fillText(" Score :000000",70,5)
 . . .
drawImage("I13",-36,12)
 . . .
drawImage("I10", 54,-7)
drawImage("I11", -2,2)
drawImage("I12", 1,4)
 . . .
rotate(45)
drawImage("I7",-2,29)
rotate(0)
drawImage("I8",-3,5)
rotate(0)
drawImage("I9",-3,3)
 . . .
```

SERVER AND METHOD FOR PROVIDING A VIDEO GAME

CROSS-REFERENCE TO RELATED APPLICATIONS

This application is based on and claims the benefit of priority from Japanese Patent Application Serial No. 2013-167266 (filed on Aug. 12, 2013), the contents of which are hereby incorporated by reference in their entirety.

TECHNICAL FIELD

The present invention relates to a server and a method for providing games, and in particular, to a server and a method for providing games to a plurality of terminal devices communicatively connected to the server.

BACKGROUND

There are conventionally known systems for providing online games to user terminals such as personal computers, smartphones, or game-dedicated terminals connected to the system via a communication line such as the Internet (see, e.g., Japanese Patent Application Publication No. 2013-066524). For example, in a system for providing services generally called cloud gaming, a server performs arithmetic processing and image processing in accordance with progression of the game based on input information sent from a user terminal, and sends the result of the processing to the user terminal in the form of a video. For another example, in a system for providing services generally called multi-player online games, a server communicates with a game-dedicated terminal or a user terminal having installed thereon dedicated software by using a dedicated protocol, thereby providing games that can be simultaneously played by many users.

SUMMARY

However, the above cloud gaming imposes a load on networks in sending game screens to user terminals in the form of a large volume of video. It is difficult to send game screens having adequate quality to user terminals connected via, for example, instable mobile networks. Further, even if videos are compressed to a smaller volume, the compression process imposes a load on the CPU of the server. Thus, cloud gaming is not suited for providing games that imposes a load on the CPU of the server such as games simultaneously played by many users. Further, the multi-player online games mentioned above require development of a dedicated protocol used for communication between the dedicated terminals and the server.

An object of the embodiments of the present invention is to reduce the load on the server and reduce the communication traffic produced in providing online games. Other objects of the present invention will be apparent with reference to the entire description in this specification.

A server according to an embodiment of the present invention is a server for providing a game to a plurality of terminal devices communicatively connected to the server, the server comprising: one or more processors configured to execute a program, the program comprising: a game progress module configured to progress the game in accordance with input information sent from one of the plurality of terminal devices; a generation module configured to generate frame information at predetermined intervals in accordance with progression of the game, the frame information containing at least a plurality of first type drawing commands to be executed on the terminal device to render one frame of a game screen in accordance with progression of the game on the terminal device, each of the plurality of first type drawing commands including object information specifying an object to be drawn and coordinate information specifying a coordinate where the object is to be drawn; a compression module configured to compress the generated frame information; and a sending module configured to send the compressed frame information to the terminal device.

A method according to an embodiment of the present invention is a method of providing a game to a plurality of terminal devices communicatively connected, the method comprising: progressing the game in accordance with input information sent from one of the plurality of terminal devices; generating frame information at predetermined intervals in accordance with progression of the game, the frame information containing at least a plurality of first type drawing commands to be executed on the terminal device to render one frame of a game screen in accordance with progression of the game on the terminal device, each of the plurality of first type drawing commands including object information specifying an object to be drawn and coordinate information specifying a coordinate where the object is to be drawn; compressing the generated frame information; and sending the compressed frame information to the terminal device.

Various embodiments of the present invention reduce the load on the server and reduce the communication traffic produced in providing online games.

DESCRIPTION OF EXAMPLE EMBODIMENTS

Figure 1:
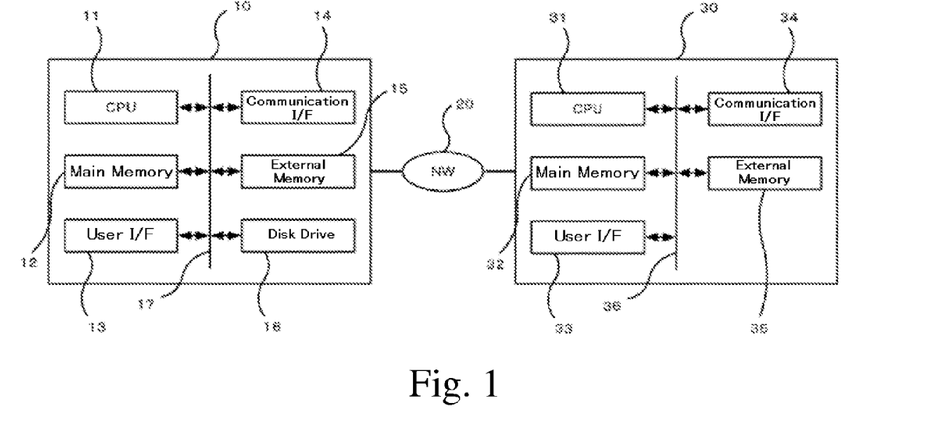
FIG. 1 is a block diagram schematically illustrating a network configuration of a system 1 including a server 10 according to an embodiment of the present invention.

FIG. 1 is a block diagram schematically illustrating a network configuration of a system 1 including a server 10 according to an embodiment of the present invention. As shown in FIG. 1, the server device 10 according to an embodiment may be communicatively connected via a communication network 20 such as the Internet to a terminal device 30 configured as a conventional computer, and may provide various games to a user operating the terminal device 30. Additionally, the server 10 may be communicatively connected to terminal devices other than the terminal device 30 and not shown. The server 10 may provide various digital contents other than games to the user operating the terminal device 30, provide various Internet services other than provision of digital contents, and provide a platform that implements various communications between a plurality of users operating a plurality of terminal devices 30.

As illustrated in FIG. 1, the server 10 may include a central processing unit (CPU) (processor) 11, a main memory 12, a user interface (I/F) 13, a communication I/F 14, an external memory 15, and a disk drive 16, and these components may be electrically connected to one another via a bus 17. The CPU 11 may load an operating system and various programs such as control programs for controlling the progress of an online game into the main memory 12 from the external memory 15, and may execute commands included in the loaded programs. The main memory 12 may be used to store a program to be executed by the CPU 11, and may be formed of, for example, a dynamic random access memory (DRAM).

The user I/F 13 may include, for example, an information input device such as a keyboard or a mouse for accepting an input from an operator, and an information output device such as a liquid crystal display for outputting calculation results of the CPU 11. The communication I/F 14 may be implemented as hardware, firmware, or communication software such as a transmission control protocol/Internet protocol (TCP/IP) driver or a point-to-point protocol (PPP) driver, or a combination thereof, and may be configured to be able to communicate with the terminal devices 30 via the communication network 20.

The external memory 15 may be formed of, for example, a magnetic disk drive and store various programs such as a control program for controlling the progress of an online game. The external memory 15 may also store various data used in the game. The various data that may be stored in the external memory 15 may also be stored on a database server communicatively connected to the server 10 and physically separate from the server 10. The disk drive 16 may read data stored in a storage medium such as a compact disc read only memory (CD-ROM), digital versatile disc read only memory (DVD-ROM), or DVD Recordable (DVD-R) disc, or write data to such a storage medium. For example, a game application and data such as game data stored in a storage medium may be read by the disk drive 16, and may be installed into the external memory 15.

In an embodiment, the server 10 may be a web server for managing a web site including a plurality of hierarchical web pages and may be capable of providing the terminal devices 30 with game services. The terminal devices 30 may fetch HTML data for rendering a web page from the server 10 and analyze the HTML data to present the web page to a user (a user of the game) of the terminal devices 30. A game provided through such a web page is sometimes called a browser game. The HTML data for rendering the web page may also be stored on the external memory 15. The HTML data may comprise HTML documents written in markup languages such as HTML; the HTML documents may be associated with various images. Additionally, the HTML documents may include programs written in script languages such as ActionScript™ and JavaScript™.

The external memory 15 may store game applications to be executed on execution environments of the terminal device 30 other than browser software. This game application may include game programs for performing a game and various data such as image data to be referred to for executing the game programs. The game programs may be created in, for example, object oriented languages such as Objective-C™ and Java™. The created game programs may be stored on the external memory 15 in the form of application software along with various data. The application software stored on the external memory 15 may be delivered to a terminal device 30 in response to a delivery request. The application software delivered from the server 10 may be received by the terminal device 30 through a communication I/F 34 in accordance with the control of CPU 31; the received game programs may be sent to an external memory 35 and stored thereon. The application software may be launched in accordance with the user's operation on the terminal device 30 and may be executed on a platform implemented on the terminal device 30 such as NgCore™ or Android™. The server 10 may provide the game applications executed on the terminal devices 30 with various data required for progression of the games. Additionally, the server 10 can store various data sent from the terminal device 30 for each user, thereby managing the progression of the game for each user.

Thus, the server 10 may manage the web site for providing game services and deliver web pages constituting the web site in response to a request from the terminal device 30, thereby progressing the game. Also, the server 10 can progress a game by communicating with a game application performed on the terminal device 30 in place of, or in addition to, such a browser game. Whichever mode may be taken to provide the game, the server 10 can store data required to progress the game for each identification identifying a user. Briefly, the server 10 may also include a function to authenticate a user at start of the game and perform charging process in accordance with progression of the game. The games provided by the server 10 may include desired games such as action games, role playing games, interactive sports games, and card games. The types of the games implemented by the web site or game applications of the server 10 are not limited to those explicitly described herein.

In an embodiment, the terminal device 30 may be any information processing device that may display on a web browser a web page of a game web site obtained from the server 10 and include an application executing environment for executing game applications; and the terminal devices 30 may include smartphones, tablet terminals, and game-dedicated terminals.

Figure 2:
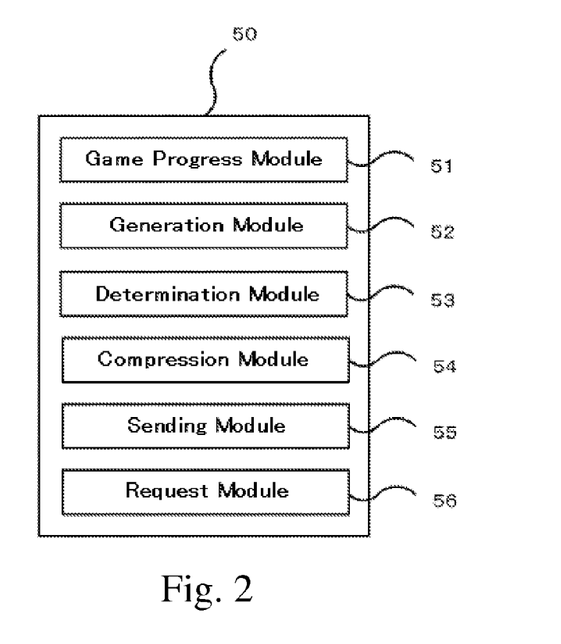
FIG. 2 is a block diagram schematically illustrating the module arrangement of a game program 50 according to an embodiment.

As illustrated in FIG. 2, the terminal device 30 may include a central processing unit (CPU) (processor) 31, a main memory 32, a user interface (I/F) 33, a communication I/F 34, and an external memory 35, and these components may be electrically connected to one another via a bus 36.

The CPU 31 may load various programs such as an operating system into the main memory 32 from the external memory 35, and may execute commands included in the loaded programs. The main memory 32 may be used to store a program to be executed by the CPU 31, and may be formed of, for example, a dynamic random access memory (DRAM).

The user I/F 33 may include an information input device for receiving user inputs and an information output device for outputting an operation result of CPU 31; and the user I/F may include a display device such as a liquid crystal display having a touch panel.

The communication I/F 34 may be implemented as hardware, firmware, or communication software such as a transmission control protocol/Internet protocol (TCP/IP) driver or a point-to-point protocol (PPP) driver, or a combination thereof, and may be configured to be able to communicate with the server 10 via the communication network 20.

The external memory 35 may comprise, for example, a magnetic disk drive or a flash memory and store various programs such as an operating system. When receiving a game application from the server 10 via the communication I/F 34, the external memory 35 may store the received game application.

A terminal device 30 having such an architecture may include, for example, browser software for interpreting an HTML file (HTML data) and rendering a screen; this browser software may enable the terminal device 30 to interpret the HTML data fetched from the server 10 and render web pages corresponding to the received HTML data. Further, the terminal device 30 may include plug-in software (e.g., Flash Player distributed by Adobe Systems Incorporated) embedded into browser software; therefore, the terminal device 30 can fetch from the server 10 a SWF file embedded in HTML data and execute the SWF file by using the browser software and the plug-in software.

When a game is executed on the terminal device 30, for example, animation or an operation icon designated by the program may be displayed on a screen of the terminal device 30. The user may enter an instruction for progressing the game using an input interface of the terminal device 30. The instruction entered by the user may be transmitted to the server 10 through the browser of the terminal device 30 or a platform function such as NgCore™.

Next, the game program 50 will be described, which is executed by the CPU 11 of the server 10 in an embodiment. FIG. 2 is a block diagram illustrating the module arrangement of a game program 50 according to an embodiment. As shown, the game program 50 may comprise: a game progress module 51 that progresses a game in accordance with input information sent from the terminal device 30; a generation module 52 for generating at first time intervals (predetermined time intervals) frame information containing a plurality of drawing commands to be executed on the terminal device 30 for rendering one frame of a game screen in accordance with progression of the game, the plurality of commands including object information specifying an object to be drawn and coordinate information specifying a coordinate where the object is to be drawn; a determination module 53 for determining whether to send the generated frame information to the terminal device 30; a compression module 54 for compressing the generated frame information; a sending module 55 for sending to the terminal device 30 the frame information to be sent to the terminal device 30; and a request module 56 for requesting drawing execution time information from the terminal device 30 at second time intervals.

Figure 3:
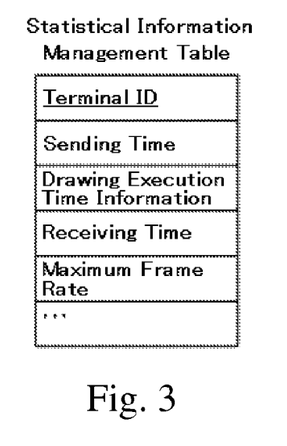
FIG. 3 is a diagram showing an example of a statistical information management table according to an embodiment.

FIG. 3 is a diagram showing an example of information managed by the statistical information management table that may be formed in the external memory 15 of the server 10. As shown, the statistical information management table according to an embodiment may manage, in association with "a terminal ID" identifying a terminal device 30, information such as "sending time" indicating the time when drawing execution time information was requested from the terminal device 30, "drawing execution time information" sent from the terminal device 30 in response to the request, "receiving time" indicating the time when the server 10 received the drawing execution time information sent from the terminal device 30 in response to the request, and "maximum frame rate" indicating the upper limit of frame rate (the number of frames per unit of time) for the terminal device 30. In an embodiment, the "drawing execution time information" may indicate an average of time required for the terminal device 30 to execute a plurality of drawing commands contained in the frame information corresponding to one frame of a game screen (an average of time required for drawing one frame); for example, the "drawing execution time information" may indicate a moving average of time required for the terminal device 30 to execute a plurality of drawing commands contained in the frame information corresponding to a predetermined number (e.g., ten) of recent frames. The operation of setting the information managed by the statistical information management table will be described later.

Next, operations of such a server 10 according to an embodiment will now be described. As described above, the server 10 according to an embodiment may provide various games; and an example of such games suited for describing an embodiment of the present invention is multi-user online games simultaneously played by a plurality of users. The operations of providing these games will now be described.

First, an outline of multi-user online games in an embodiment will now be described. In a multi-user online game according to an embodiment, a plurality of users move their own characters in a common game space to progress a game. More specific examples of multi-user online games may be various games such as role-playing games, shooting games, and action games. The processing for progressing such games may be performed mainly by executing the game progress module 51. More specifically, such processing may involve, for example, receiving from terminal device 30 various input information such as information on moving operation of characters or information on execution instruction for predetermined actions (e.g., attack, conversation, and acquisition of items), calculating the current position in the game space for characters corresponding to the user operating the terminal device 30 in response to the input information received, performing a process in accordance with the instruction for actions (e.g., battle or conversation with characters for other users or non-player characters and acquisition of items), and calculating the score obtained by the user.

Figure 4:
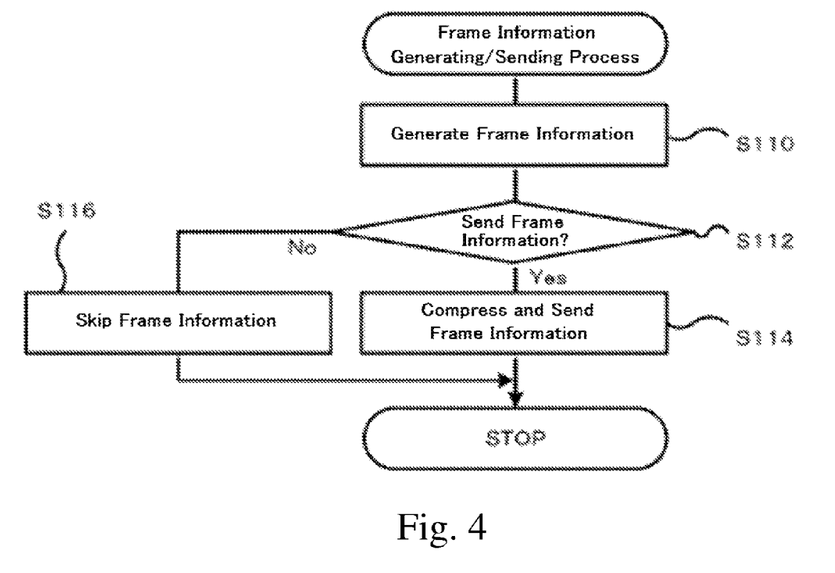
FIG. 4 is a flow diagram showing an example of a frame information generating/sending process according to an embodiment.
Figure 5:
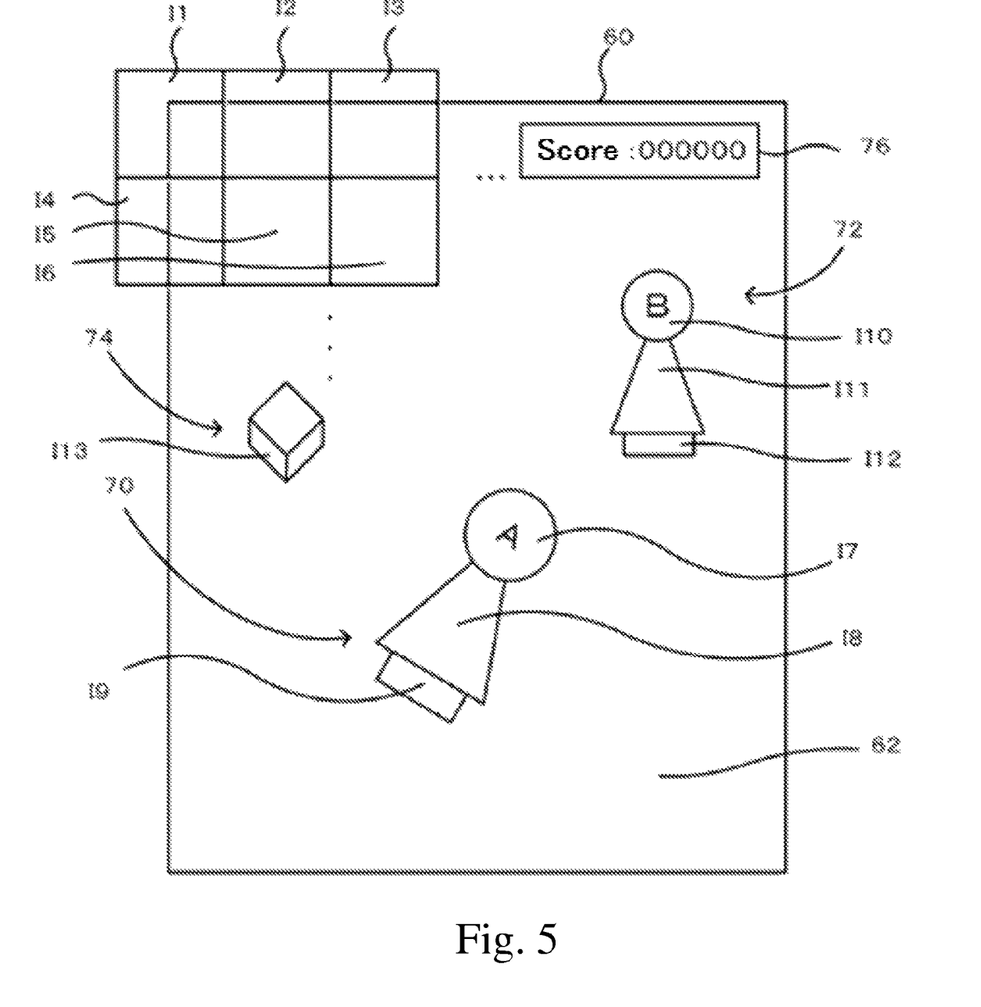
FIG. 5 is a diagram showing an example of game screen 60 according to an embodiment.

Next, operations related to display of game screens on the terminal device 30 in accordance with the above game progress will now be described. FIG. 4 is a flow diagram showing an example of frame information generating/sending process for displaying game screens on the terminal device 30 in accordance with the progress of a multi-user online game. This process may be repeatedly performed by the server 10 at predetermined time intervals (e.g., at intervals of 40 ms). As shown, the first step of the frame information generating/sending process may be to generate frame information corresponding to one frame of a game screen (step S110). This frame information may be generated for each user playing the multi-user online game (that is, for each terminal device 30). FIG. 5 shows an example of one frame of game screen 60 to be displayed on the terminal device 30. The game screen 60 in an embodiment is displayed in accordance with the current position in the game space for a user character operated by the user. As shown, superposed on the background 62 may be various objects such as a user character 70 operated by the user, a user character 72 operated by another user, an item 74, and a score display object 76 for displaying score obtained by the user in text. As shown, the background 62 is a region formed of a plurality of tile images (unit objects) with an identical shape (e.g., a rectangle) and size (e.g., 16 pixels by 16 pixels) arranged continuously in vertical and horizontal directions; for example, the region at the top left corner of the background 62 may be formed of image files I1-I3 continuously arranged in the horizontal direction and image files I4-I6 continuously arranged therebelow in the horizontal direction. Further, the user character 70 may be formed of image files I7, I8, and I9; the user character 72 may be formed of image files I10, I11, and I12; and the item 74 may be formed of an image file I13.

Figure 6:
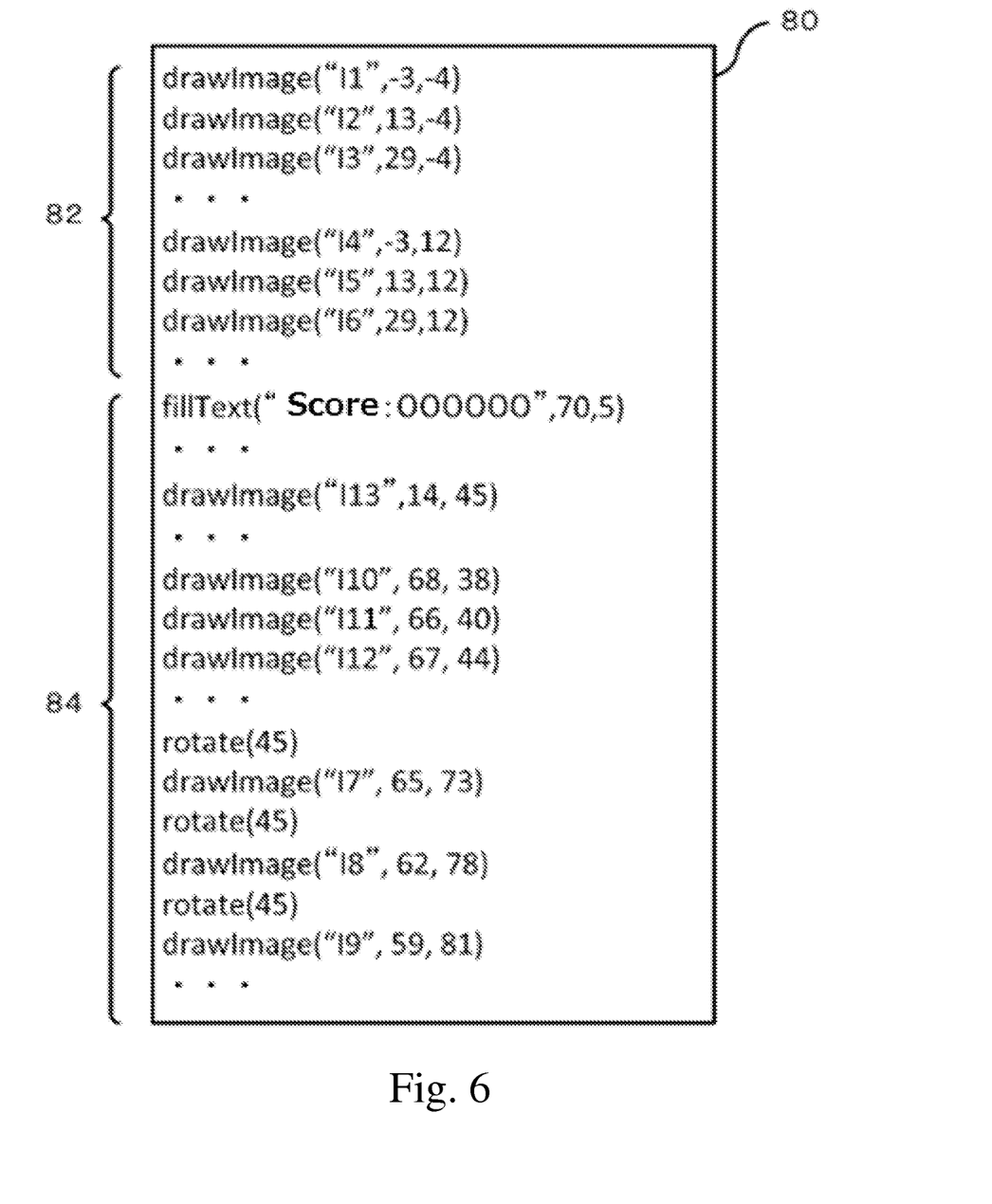
FIG. 6 is a diagram showing an example of frame information according to an embodiment.

The frame information may contain a plurality of drawing commands to be executed on the terminal device 30 to render the one frame of the game screen 60 configured as above. The drawing commands may be executed by, for example, a browser on the terminal device 30. FIG. 6 shows an example of frame information 80 containing the drawing commands for rendering the one frame of the game screen 60 shown in FIG. 5 on the terminal device 30. As shown, the upper region 82 of the frame information 80 may contain the drawing commands for drawing the background 62, and the lower region 84 under the upper region 82 may contain the drawing commands for drawing the objects to be superposed on the background 62 (specifically, the user character 70, the user character 72, the item 74, and the score display object 76). There are a plurality of types of drawing commands, such as "drawImage" command for drawing an image file, "fillText" command for drawing text, and "rotate" command for setting the rotation angle for an object to be drawn. In an embodiment, the drawing command "drawImage" may include arguments of file name specifying an image file and coordinate information specifying the coordinate where this image file is to be drawn. This command may draw an image file specified by the file name at the coordinate specified by the coordinate information. The drawing command "fillText" may include arguments of text to be drawn and coordinate information specifying the coordinate where this text is to be drawn. This command may draw text at the coordinate specified by the coordinate information. The drawing command "rotate" may include an argument of a rotation angle of an object and may be used in combination with the drawing commands for drawing an object such as "drawImage" and "fillText" described above (e.g., this command may be written immediately before the drawing commands for drawing an object). This command may set the rotation angle of the object to be drawn by the drawing command used in combination. The above types and usages of drawing commands are mere examples; and other types of drawing commands may also be applied. For example, the types and usages of other drawing commands compliant to the canvas element of HTML5 and the types and usages of drawing commands compliant to other standards may also be applied.

Figure 7:
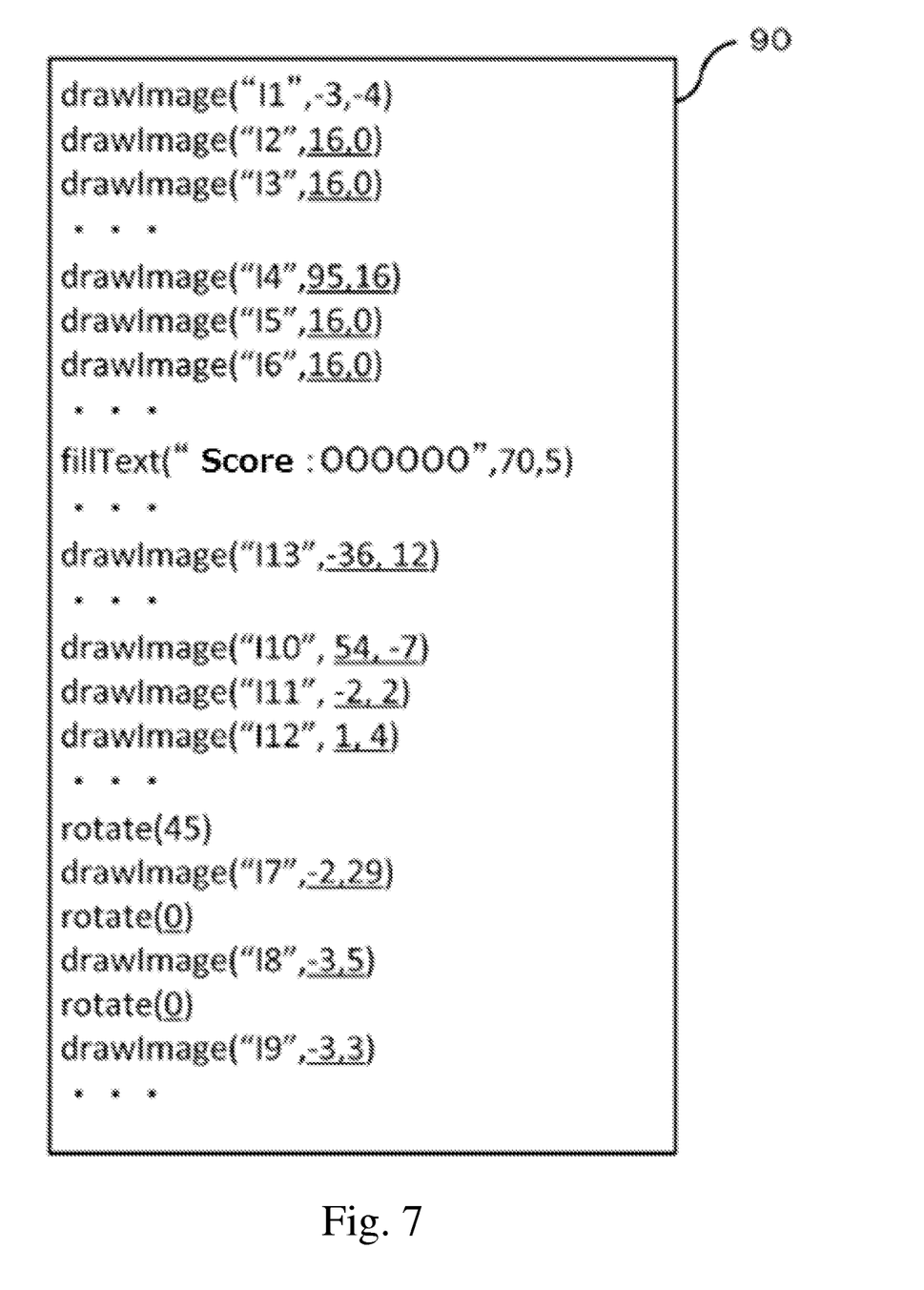
FIG. 7 is a diagram showing another example of frame information according to an embodiment.

FIG. 7 shows frame information 90, that is, another example of frame information. The frame information 90 may be generated based on the frame information 80 described above. More specifically, in the frame information 90, the drawing command "drawImage" may include converted coordinate information in the form of the difference from the coordinate specified by the coordinate information included in the preceding drawing command "drawImage" of the same type. In the example shown, the drawing command "drawImage ("I2", I3, −4)" has been converted into "drawImage ("I2", 16, 0)" so as to include the coordinate information in the form of the difference from the coordinate specified by the coordinate information of the preceding drawing command "drawImage ("I1", −3, −4)" Likewise, the drawing command "drawImage ("I3", 29, −4)" has been converted into "drawImage ("I3", 16, 0)." Since the plurality of tile images forming the background 62 have an identical shape with a predetermined height and width, the difference in coordinate between any two tile images vertically or horizontally continuous to each other is the same value (in the example shown in FIG. 7, the difference in coordinate between two tile images horizontally continuous to each other is "16, 0"). Further, in the frame information 90, the drawing command "rotate" may include converted rotation angle information in the form of the difference from the rotation angle specified by the rotation angle information included in the preceding drawing command "rotate" of the same type. In the example shown, both the drawing command "rotate (45)" for setting the rotation angle of an image file "I8" and the drawing command "rotate (45)" for setting the rotation angle of an image file "I9" are converted into "rotate (0)." A plurality of image files in a frame constituting one object, such as the images files I7-I9 constituting the user character 70, may tend to have the same rotation angle set thereto; as a result, the difference from the rotation angle specified by the rotation angle information of the preceding drawing command "rotate" may tend to be "zero" successively. Both the frame information 80 and the frame information 90 may be independent from the frame information of the preceding frame, and each may contain information required to draw one frame.

After frame information is thus generated, it may be determined whether to send the generated frame information to the terminal device 30 (step S112). In an embodiment, the necessity of sending the frame information may be determined such that the frame information may be sent within the "maximum frame rate" for the terminal device 30 managed by the statistical information management table described above. For example, when the frame information generating/sending process is repeated at 40 ms intervals, the frame rate for the frame information uncompressed may be 25 fps (1000/40 ms). If the upper limit preset is 20 fps for example, which is smaller than 25 fps, it may be determined that five frames out of the 25 frames (generated in the frame information generating/sending process performed 25 times) are not to be sent so as to keep the frame rate within the upper limit of 20 fps. It may also be determined that frame information should not be sent until a recent actual frame rate is within the upper limit, the recent actual frame rate being calculated for each terminal device 30 and managed by tables such as the statistical information management table. The methods of keeping the frame rate for frame information within the upper limit of the frame rate are not limited to the above methods. Additionally, if the "maximum frame rate" of the statistical information management table is set to "0," it may always be determined that frame information should not be sent. The method of setting the "maximum frame rate" will be described later.

If it is determined that frame information should be sent, the frame information may be compressed and sent to the terminal device 30 (step S114); and if it is determined that frame information should not be sent, sending of the frame information may be skipped (step S116). Then, the frame information generating/sending process may be ended. The frame information may be compressed by using various compression algorithms including reversible compression algorithms such as "deflate." In the case of frame information including the coordinate information and the rotation angle information converted into the difference from the preceding coordinate and angle as in the frame information 90 shown in FIG. 7, the coordinate information and the rotation angle information (arguments of drawing commands) may often include the same values, as described above; and thus the compression rate in compressing the frame information may be high. The compression of frame information may be performed across a plurality of frames by using, for example, a dictionary. While the above frame information generating/sending process is repeatedly performed, the terminal device 30 may decrypt the received frame information and execute the drawing commands contained in the frame information on a browser for example, thereby to repeatedly render the frames of the game screen 60 in order. In the case of frame information including the coordinate information and the rotation angle information converted into the difference from the preceding coordinate and angle as in the frame information 90, the terminal device 30 may inversely convert the coordinate information and the rotation angle information into information directly specifying a coordinate and a rotation angle, and execute the drawing commands.

Figure 8:
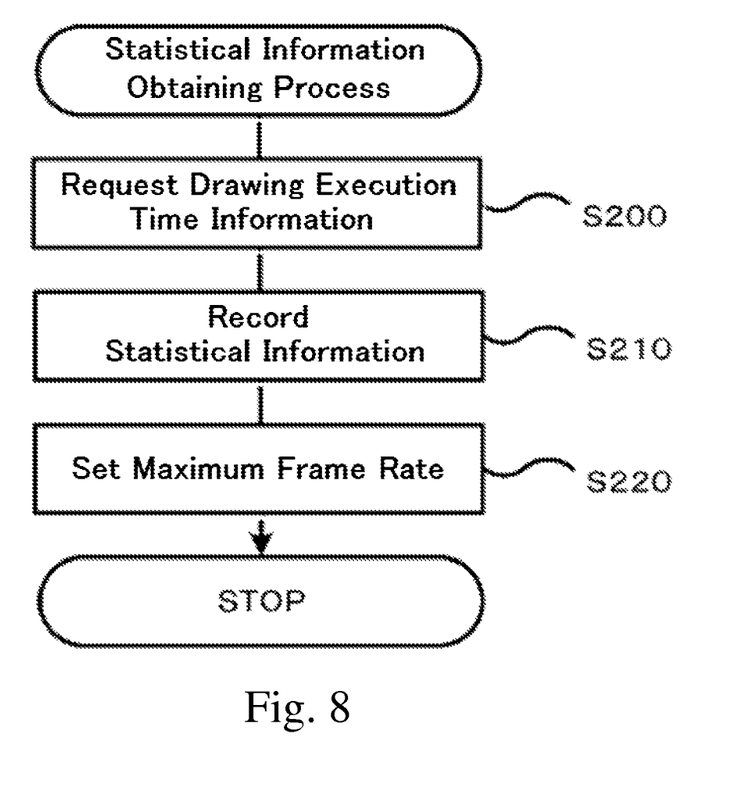
FIG. 8 is a flow diagram showing an example of a statistical information obtaining process according to an embodiment.

The above was the description of operations related to display of game screens on the terminal device 30 in accordance with progression of games. Next, operations of obtaining statistical information related to performance of the terminal device 30 will now be described. FIG. 8 is a flow diagram showing an example of the statistical information obtaining process for obtaining statistical information. This process may be repeatedly performed by the server 10 at predetermined time intervals (e.g., at intervals of 100 ms). As shown, the first step of the statistical information obtaining process may be to request drawing execution time information from the terminal device 30 (step S200). This request may be made for each of the terminal devices 30 operated by a plurality of users playing the multi-user online game. In an embodiment, a request for drawing execution time information may be made by sending to the terminal device 30 the current time managed by the server 10 and information that instructs sending of the drawing execution time information. The terminal device 30 that has received these information may send to the server 10 the received current time (the time when the server 10 requested drawing execution time information) and the drawing execution time information on the terminal device 30. In an embodiment, the terminal device 30 may execute a program for a process of managing the drawing execution time information (e.g., an average time required for one frame to be drawn), and the managed drawing execution time information may be sent to the server 10 by this program.

The next step may be to record the information received from the terminal device 30 into the statistical information management table (step S210). More specifically, the received current time may be recorded into the "sending time" field, the received drawing execution time information may be recorded into the "drawing execution time information" field, and the time when these information items were received is recorded into the "receiving time" field.

Then, an upper limit of frame rate may be set for the terminal device 30 (step S220), and the statistical information obtaining process may be ended. The upper limit of frame rate may be set by various methods. For example, the upper limit may be set to a frame rate that can be implemented by the terminal device 30, based on the drawing execution time information. For a specific example, if (the average of) the drawing time for one frame on the terminal device 30 is 50 ms, the number of frames that can be drawn in one second is 20; thus, the upper limit of frame rate may be set to 20 fps (Frames Per Second) or smaller (e.g., 20 fps×0.8=16 fps). Another method of setting the upper limit of frame rate may be to calculate the frame rate that can be implemented by the terminal device 30 based on, for example, the elapsed time from the point when the server 10 requested the drawing execution time information from the terminal device 30 to the point when the server 10 received the drawing execution time information from the terminal device 30 (round trip time, or RTT, which can be calculated from the sending time and the receiving time recorded in the statistical information management table). For a more specific example, the upper limit of frame rate may be set to "3,000/RTT (ms)" based on experimental values. In this case, for example, if RTT is 100 ms, the upper limit of frame rate is 30 fps; and if RTT is 150 ms, the upper limit of frame rate is 20 fps. Thus, the upper limit of frame rate may be set based on RTT, whereby the upper limit of frame rate may be lowered and the amount of frame information sent to the terminal device 30 may be reduced when RTT is temporarily increased by, for example, a handover between base stations in a mobile network; therefore, the amount of frame information to be processed after the communication conditions for the terminal device 30 are restored is reduced, and normal operation can be restored quickly. If RTT exceeds a predetermined threshold value (e.g., 500 ms), the upper limit of frame rate may be set to "0." This may stop sending of frame information when the communication conditions for the terminal device 30 are extremely poor; therefore, normal operation can be restored more quickly. Additionally, setting of the upper limit of frame rate in step S220 may also be performed in a step outside of the statistical information obtaining process.

Suppose the case where the upper limit of frame rate is set to "0," and the sending of frame information is successively skipped in the frame information generating/sending process shown in FIG. 4. In this case, no frame information is sent from the server 10 to the terminal device 30 in the frame information generating/sending process; therefore, if there is a packet loss in TCP communication, for example, the packet may be resent after a predetermined time period (e.g., three seconds) during which the terminal device 30 does not send an acknowledgment. In an embodiment, however, the statistical information obtaining process described above may produce data communication (requests for drawing execution time information) to the terminal device 30 while no frame information is sent to the terminal device 30; therefore, "TCP fast retransmit" function of TCP communication may retransmit the packet before the above predetermined time elapses, enabling quick recovery from the packet loss.

The server 10 in the above embodiment may repeatedly generate and compress frame information containing a plurality of drawing commands to be executed on the terminal device 30 to render one frame of a game screen and send the frame information to the terminal device 30 at predetermined time intervals. Accordingly, as compared to the case where a game screen is sent in the form of video, the volume of drawing commands is small, and load of compression process is also small; this may reduce the communication traffic with the terminal device 30 and the load on the server 10. In the frame information 90, the drawing command "drawImage" (a first type of drawing command) may include converted coordinate information in the form of the difference from the coordinate specified by the coordinate information included in the preceding drawing command "drawImage" of the same type; and thus the coordinate information may often include the same values, which may increase the compression rate in compressing the frame information. Likewise, in the frame information 90, the drawing command "rotate" (a second type of drawing command) may include converted rotation angle information in the form of the difference from the rotation angle specified by the rotation angle information included in the preceding drawing command "rotate" of the same type; and thus the rotation angle information may often include the same values, which may increase the compression rate in compressing the frame information. As a result, the communication traffic may be further reduced.

The processes and procedures described and illustrated herein may also be implemented by software, hardware, or any combination thereof other than those explicitly stated for the embodiments. More specifically, the processes and procedures described and illustrated herein may be implemented by the installation of the logic corresponding to the processes into a medium such as an integrated circuit, a volatile memory, a non-volatile memory, a magnetic disk, or an optical storage. The processes and procedures described and illustrated herein may also be installed in the form of a computer program, and executed by various computers.

Even if the processes and the procedures described herein are executed by a single apparatus, software piece, component, or module, such processes and procedures may also be executed by a plurality of apparatuses, software pieces, components, and/or modules. Even if the data, tables, or databases described herein are stored in a single memory, such data, tables, or databases may also be dispersed and stored in a plurality of memories included in a single apparatus or in a plurality of memories dispersed and arranged in a plurality of apparatuses. The elements of the software and the hardware described herein can be integrated into fewer constituent elements or can be decomposed into more constituent elements.

With respect to the use of substantially any plural and/or singular terms herein, those having skill in the art can translate from the plural to the singular and/or from the singular to the plural as is appropriate to the context.

What is claimed is:

1. A server for providing a game to a plurality of terminal devices communicatively connected to the server, the server comprising:
    a central processing unit;
    memory storage configured to store machine-readable instructions that, when executed, cause the central processing unit to
    progress the game in accordance with input information sent from one of the plurality of terminal devices;
    generate frame information at predetermined intervals in accordance with progression of the game, the frame information containing at least a plurality of first type drawing commands to be executed on the terminal device to render one frame of a game screen in accordance with progression of the game on the terminal device, each of the plurality of first type drawing commands including object information specifying an object to be drawn and coordinate information specifying a coordinate where the object is to be drawn, wherein the coordinate information is in a form of difference between the coordinate where the object is to be drawn and a coordinate specified by coordinate information included in a preceding drawing command of the first type;
    compress the generated frame information; and
    send the compressed frame information to the terminal device; and, wherein
    the game screen contains a region having a plurality of unit objects with an identical shape continuously arranged in vertical and/or horizontal directions; and
    the frame information contains the plurality of first type drawing commands for drawing at least the plurality of unit objects arranged continuously, the plurality of first type drawing commands arranged in the same order as the plurality of unit objects are to be arranged.

2. The server of claim 1, wherein
    the frame information contains a second type drawing command including a rotation angle information specifying a rotation angle of the object to be drawn; and
    the second type drawing command includes the rotation angle information in a form of difference between the rotation angle of the object and a rotation angle specified by rotation angle information of the second type drawing command written immediately before if there is the second type drawing command written immediately before.

3. The server of claim 1, wherein
    the game is simultaneously played by a plurality of users each operating one of the plurality of terminal devices;
    the frame information is generated for each of the plurality of terminal devices; and
    the compressed frame information is sent to each of the plurality of terminal devices.

4. A method using a server for providing a game to a plurality of terminal devices communicatively connected to the server, the method being implemented in a central processing unit of the server by executing machine readable instructions, the method comprising:
    progressing the game in accordance with input information sent from one of the plurality of terminal devices;
    generating frame information at predetermined intervals in accordance with progression of the game, the frame information containing at least a plurality of first type drawing commands to be executed on the terminal device to render one frame of a game screen in accordance with progression of the game on the terminal device, each of the plurality of first type drawing commands including object information specifying an object to be drawn and coordinate information specifying a coordinate where the object is to be drawn, wherein the coordinate information is in a form of difference between the coordinate where the object is to be drawn and a coordinate specified by coordinate information included in a preceding drawing command of the first type;
    compressing the generated frame information; and
    sending the compressed frame information to the terminal device; and,
    wherein the game screen contains a region having a plurality of unit objects with an identical shape continuously arranged in vertical and/or horizontal directions; and
    the frame information contains the plurality of first type drawing commands for drawing at least the plurality of unit objects arranged continuously, the plurality of first type drawing commands arranged in the same order as the plurality of unit objects are to be arranged.

* * * * *